(12) United States Patent
Mendez

(10) Patent No.: US 11,549,526 B2
(45) Date of Patent: Jan. 10, 2023

(54) LINEAR AND ROTARY ACTUATORS

(71) Applicant: Government of the United States, as represented by the Secretary of the Air Force, Wright-Patterson AFB, OH (US)

(72) Inventor: Edgar G Mendez, California City, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/681,884

(22) Filed: Feb. 28, 2022

(65) Prior Publication Data
US 2022/0299047 A1    Sep. 22, 2022

Related U.S. Application Data

(60) Provisional application No. 63/162,580, filed on Mar. 18, 2021.

(51) Int. Cl.
| | |
|---|---|
| *F15B 15/06* | (2006.01) |
| *F16H 25/22* | (2006.01) |
| *F15B 15/14* | (2006.01) |

(52) U.S. Cl.
CPC .......... *F15B 15/063* (2013.01); *F15B 15/068* (2013.01); *F15B 15/14* (2013.01); *F16H 25/2204* (2013.01); *F15B 2015/1495* (2013.01)

(58) Field of Classification Search
CPC ...... F15B 15/06; F15B 15/063; F15B 15/068; F15B 15/1404; F15B 15/1409
See application file for complete search history.

(56) References Cited

U.S. PATENT DOCUMENTS 2,918,799 A * 12/1959 Geyer ............... F16H 25/20
  92/33
2,955,579 A * 10/1960 Block ............. F15B 15/063
  92/33

(Continued)

FOREIGN PATENT DOCUMENTS

| DE | 4215257 A1 * | 11/1993 | ............ F15B 15/068 |
| KR | 20100063484 A * | 6/2010 | |
| KR | 20150129136 A * | 11/2015 | |

*Primary Examiner* — Thomas E Lazo
(74) *Attorney, Agent, or Firm* — AFMCLO/JAZ; Jeffrey V. Bamber

(57) ABSTRACT

Combination linear and rotary actuators are disclosed. The linear and rotary actuators have a housing defining a cylindrical interior space and a pair of pistons located inside the cylindrical interior space. An inner bearing cylinder is provided that has spaced-apart ball bearings arranged in a helical pattern on its surface that engage with a structure having an inner surface with helical grooves therein. The structure at least indirectly engages a linear drive piston that is slidably mounted in the housing, and provides rotational movement thereto. The linear drive piston has an input shaft that has ball bearings on its surface, and is inserted inside the output shaft of a revolution piston that has an inner surface with linear grooves. The actuators use hydrostatically charged integral bearing races that activate during operation to reduce friction. Combination linear and rotary actuators with double actuation output shafts are also provided.

15 Claims, 10 Drawing Sheets

(56) References Cited

U.S. PATENT DOCUMENTS

| | | | |
|---|---|---|---|
| 3,815,479 A | | 6/1974 | Thompson |
| 4,114,517 A | * | 9/1978 | Teramachi ............ F15B 15/063 92/33 |
| 4,192,482 A | | 3/1980 | Goldman et al. |
| 4,498,371 A | * | 2/1985 | Lew ........................ F01B 3/08 92/33 |
| 4,745,847 A | | 5/1988 | Voss |
| 4,882,979 A | | 11/1989 | Weyer |
| 4,945,779 A | * | 8/1990 | Williams .............. F15B 15/068 92/33 |
| 5,178,030 A | * | 1/1993 | Bousquet .............. F15B 15/068 74/99 A |
| 5,417,404 A | | 5/1995 | Varden |
| 5,570,769 A | | 11/1996 | Eicher et al. |
| 7,146,900 B1 | * | 12/2006 | Matsumoto ........... F15B 15/063 91/170 R |
| 9,010,372 B2 | | 4/2015 | Fangmeier |
| 9,835,183 B2 | * | 12/2017 | Weyer ..................... F15B 15/06 |
| 9,964,127 B2 | * | 5/2018 | Burmester .......... F16K 31/5282 |
| 10,100,850 B1 | * | 10/2018 | Raymond ............. F15B 15/068 |
| 10,859,180 B2 | * | 12/2020 | Villeret ............... F16K 31/1225 |
| 11,306,749 B1 | * | 4/2022 | Raymond ............... F03B 13/02 |

\* cited by examiner

LINEAR AND ROTARY ACTUATORS

Pursuant to 37 C.F.R. § 1.78(a)(4), this application claims the benefit of and priority to prior filed co-pending Provisional Application Ser. No. 63/162,580, filed Mar. 18, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to linear and rotary actuators, and more particularly to low friction linear and rotary actuators.

BACKGROUND OF THE INVENTION

Actuators are used in a variety of industries. Some actuators are used in conveyor systems to transport material or products across distances within a factory, others are used in construction equipment to provide the lever arm forces for earth moving scoops, dumps or blades. In the aerospace industry, actuators are used to remotely operate fluid control valves connected to fluid handling systems, provide gimbal movement to propulsion systems, and provide movement for aircraft control systems. The actuators can provide either rotary or linear motion or these motions in combination to operate valves, equipment or control surfaces.

Actuators can be configured to have a single or multiple moveable shaft ends. A double acting actuator will control pressure on both sides of the driving piston, creating a pressure differential to move the shaft for linear and/or rotary motion. A single acting actuator will use pressure on one side of the piston and a spring on the other to return the shaft to the unpressurized position.

Two examples of linear and rotary actuators are shown in U.S. Pat. No. 2,918,799 "Combined Linear and Rotary Actuator", Geyer, which is for aircraft control systems, and U.S. Pat. No. 4,498,371 "Direct Acting Rotary Actuator Cylinder", Lew, which is intended for use in the actuation of fluid handling systems.

Both of these devices use a rectangular helical groove to provide the rotary motion of the output shaft using a guide consisting of either a mating screw contact area or raised cylindrical cam rollers. A piston is typically used to create motion connected to the helical device which rotates the output shaft. A second piston is typically used to create pure linear motion of the output shaft. The linear motion piston drives a shaft which slides within a mating receptacle. These actuators are only configured for single output shafts.

The generation of the helical motion using existing methods results in higher friction leading to higher torque requirements and higher driving piston pressures. Generation of the linear motion within the sliding mating receptacle is shown to have a high contact surface area as well leading to higher friction and higher driving piston pressures to create the motion. One way to reduce friction is to have greater tolerance between helical guide pins or grooves, but this leads to increased output shaft play. Cost is proportional to pressure, and when devices require higher pressure, the costs of manufacturing, support equipment, and operations increase.

The linear actuators in the aforementioned patents are not amenable to double actuation output shafts without extensive redesign. These linear actuators are limited to single output shafts due to unsymmetrical or non-modular design. This, along with the higher torque requirements, limits the actuator's ability to be adapted for use in new innovative designs.

A need, therefore, exists for improved linear and rotary actuators.

SUMMARY OF THE INVENTION

The present invention relates generally to linear and rotary actuators. The actuators may be combined linear and rotary actuators. In some cases, combination linear and rotary actuators with double actuation output shafts may be provided.

While the invention will be described in connection with certain embodiments, it will be understood that the invention is not limited to these embodiments. To the contrary, this invention includes all alternatives, modifications, and equivalents as may be included within the spirit and scope of the present invention.

In a first embodiment of the present invention, a combined linear and rotary actuator is provided. The linear and rotary actuator comprises a housing defining a cylindrical interior space, a first end cap at the first end of the housing and a second end cap at the second end of the housing. The second end cap has an opening therein for an output shaft. A pair of pistons are located inside the cylindrical interior space of the housing. An inner bearing cylinder is provided that has a shaft having ball bearings arranged in a helical pattern on its outer surface extending partially outward from its outer surface. The inner bearing cylinder may be joined to the first end cap and extend into the interior space of the housing. A revolution drive is assembly rotationally mounted in the housing. The revolution drive assembly comprises a revolution piston having two sides, a first tubular portion extending from a first side of the revolution piston, and a second tubular portion extending from a second side of the revolution piston. The first tubular portion has an interior surface with helical grooves therein. The first tubular portion fits over the inner bearing cylinder and is rotatable thereon. The second tubular portion has an interior surface with longitudinally-oriented grooves therein. A linear drive assembly is slidably mounted in the housing. The linear drive assembly comprises: a linear drive piston having two sides; a linear drive cylinder extending from a first side of said linear piston toward the first end of the housing, wherein the linear drive cylinder has an outer surface with a plurality of ball bearings arranged in spaced apart, longitudinally-oriented rows extending partially outwardly therefrom. The linear drive cylinder is slidably mounted inside the second tubular portion of the revolution drive assembly. A shaft extends from a proximal end adjacent a second side of the linear piston to a distal end that extends through the opening in the second end cap and beyond the second end of the housing. The revolution piston and the linear drive piston divide the interior space into a plurality of chambers. The housing has a fluid passageway for each of the chambers to permit pressurized fluid to flow into and out of each of the chambers to facilitate movement of the pistons, which will in turn cause linear and/or rotational movement of the shaft.

In a second embodiment of the present invention, a combined linear and rotary actuator is provided that differs in several respects from the previous embodiment. In this alternative embodiment, an inner bearing cylinder assembly is provided that is not joined to the first end cap, but rather is movable with respect to the first end cap. The inner bearing cylinder assembly comprises an inner bearing piston and an inner bearing cylinder joined to the inner bearing piston. The inner bearing cylinder extends into the interior space toward the second end of the housing. The inner bearing cylinder has an interior surface with longitudinally-oriented grooves therein and an outer surface with a plurality of spaced apart ball bearings arranged in a helical pattern extending partially outward from its outer surface.

This alternative embodiment also differs in that it comprises a revolution drive divider section in the housing that is joined to the housing in a fixed position and may comprise a portion of the housing. The revolution drive divider section has two sides and a generally cylindrical passageway extending between the sides of the divider section. The passageway has an interior surface with helical grooves therein. The inner bearing cylinder is positioned so that it extends at least part of the way into the generally cylindrical passageway of the revolution drive divider section wherein the ball bearings in the helical pattern engage with the helical grooves.

This embodiment further comprises a linear drive assembly that is slidably mounted in the housing. The linear drive assembly comprises: a linear drive piston having two sides; a linear drive cylinder extending from a first side of the linear piston toward the first end of the housing; and a shaft extending from proximal end adjacent a second side of the linear drive piston to a distal end. The linear drive cylinder has an outer surface with a plurality of ball bearings arranged in spaced apart, longitudinally-oriented rows extending partially outwardly therefrom. The linear drive cylinder is inserted into the generally cylindrical passageway of the revolution drive section and is slidably mounted inside of the inside surface of the inner bearing cylinder. The shaft extends through the opening in the second end cap and beyond the second end of the housing.

The revolution drive divider section divides the interior space into two chambers, wherein the housing has fluid passageways for each of the chambers to permit pressurized fluid to flow into and out of each of the chambers on either side of the inner bearing piston and the linear drive piston to facilitate movement of the pistons, which will in turn cause linear and/or rotational movement of the shaft.

In a third embodiment, a version of the first embodiment described above is provided that is configured into a double-ended actuator.

In a fourth embodiment, a version of the second embodiment described above is provided that is configured into a double-ended actuator.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to improved linear and rotary actuators.

Figure 8:
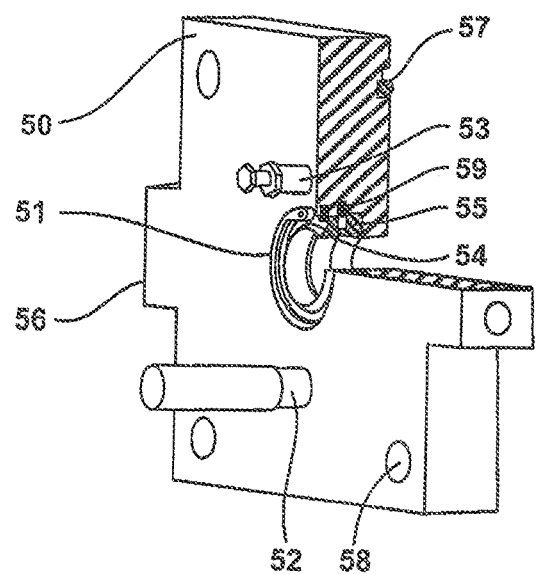
FIG. 8 is a partial sectional perspective view of the stem housing assembly.
Figure 9:
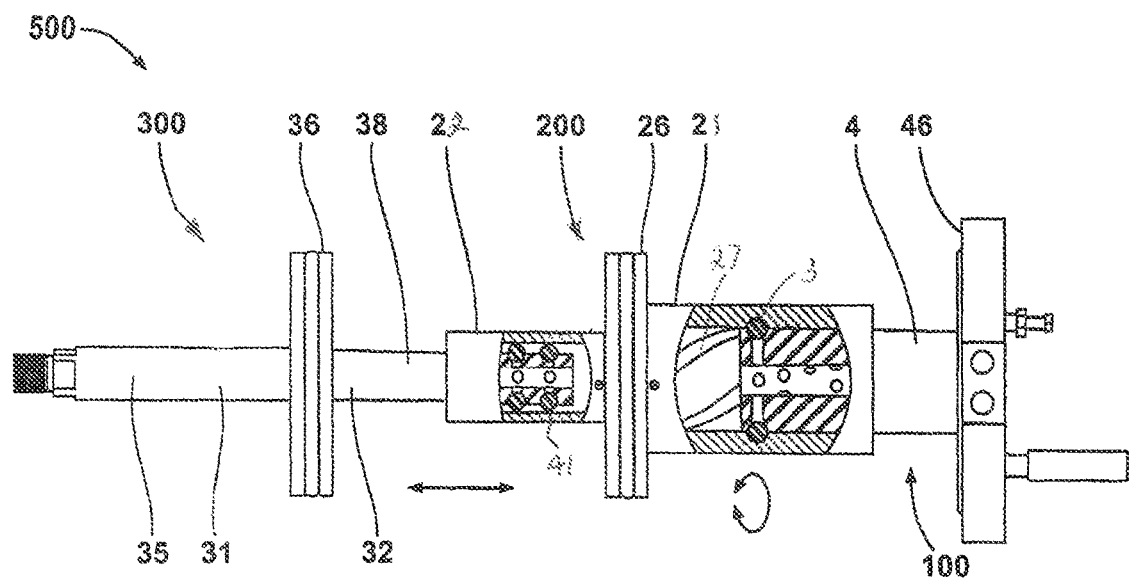
FIG. 9 is a partially cut away side view of the LRA inner workings assembly.
Figure 10:
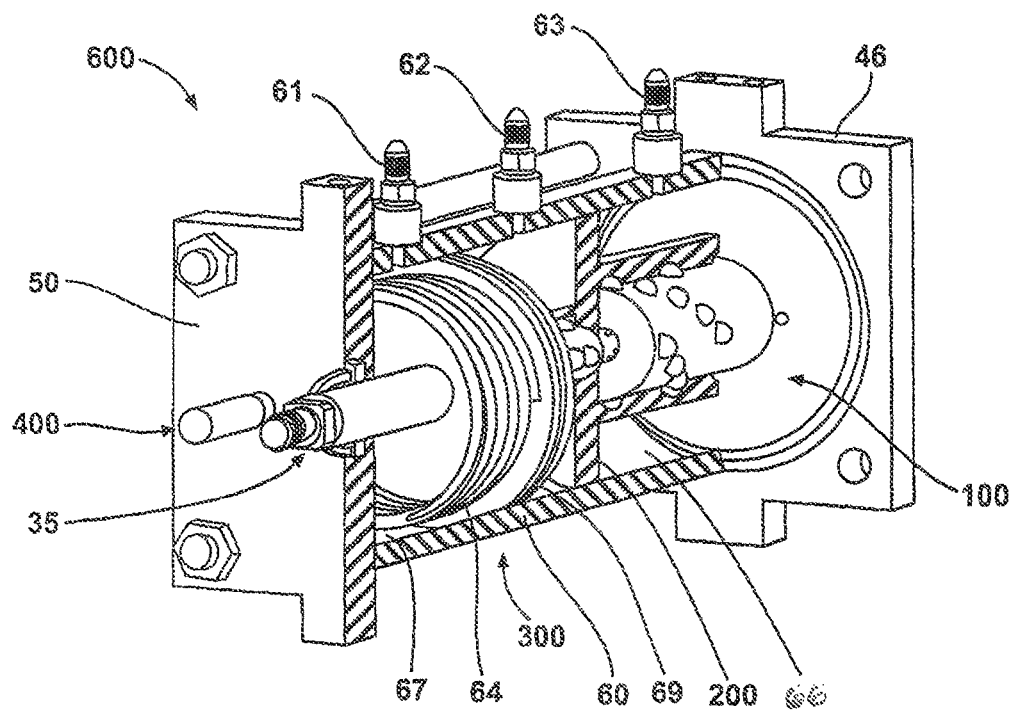
FIG. 10 is a cut away perspective view of the LRA assembly.
Figure 11:
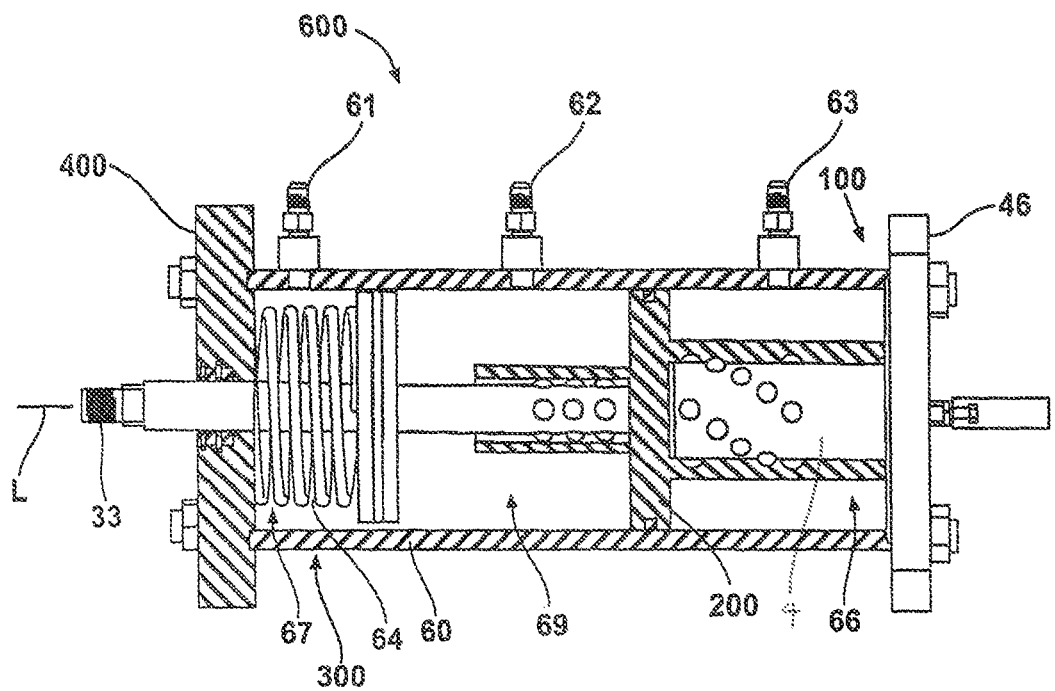
FIG. 11 is a cut away side view of the LRA assembly.

FIGS. 1-11 show the components of one embodiment of an improved combination linear and rotary actuator. FIGS. 10 and 11 show the assembly of the components in the prior figures into the combination linear and rotary actuator 600. FIG. 10 shows that this embodiment of the improved linear and rotary actuator 600 generally comprises: a housing 60 having a first end and a second end, the housing defining a cylindrical interior space; a helical end housing assembly 100; a revolution drive assembly 200; a linear drive assembly 300; and a stem housing assembly 400. As shown in FIG.

11, the housing 60 has a longitudinal axis, L, and extends from a first end to a second end of the linear and rotary actuator 600.

Figure 1:
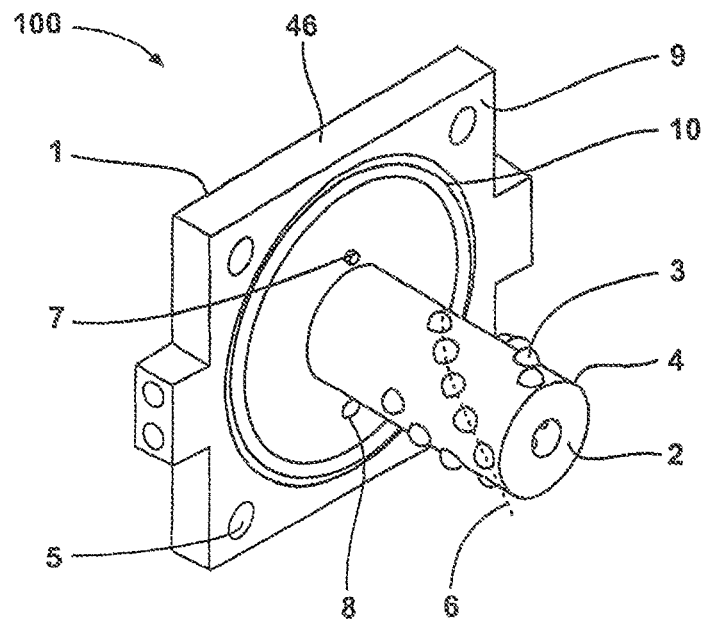
FIG. 1 is a perspective view of helical end housing assembly of one embodiment of an improved linear and rotary actuator ("LRA").

FIG. 1 is a perspective view of helical end housing assembly 100 and elements thereof. The helical end housing assembly 100 comprises a first end cap 46 comprising an outer portion (or "outer face") 1 and inner face 9. The first end cap 46 retains the housing seal 10. The first end cap 46 has a plurality of housing attachment openings 5 through which the first end cap 46 is securely attached to the cylindrical portion of the housing 60 as shown in FIGS. 10 and 11 using nuts and bolts or the like. The helical end housing assembly 100 comprises an inner bearing cylinder 4 that has an end face 2. The inner bearing cylinder 4 incorporates a plurality of ball bearings 3 that are arranged along a plurality of spaced-apart helical curves 6 on the outer surface thereof. The outer portion 1 of the first end cap 46 also has provision for a drive limiter fitting 7 which is used to limit the position of revolution drive device 200 shown in FIG. 4, and a position indicator fitting 8 which is used to transmit the calibrated position to the control system.

Figure 2:
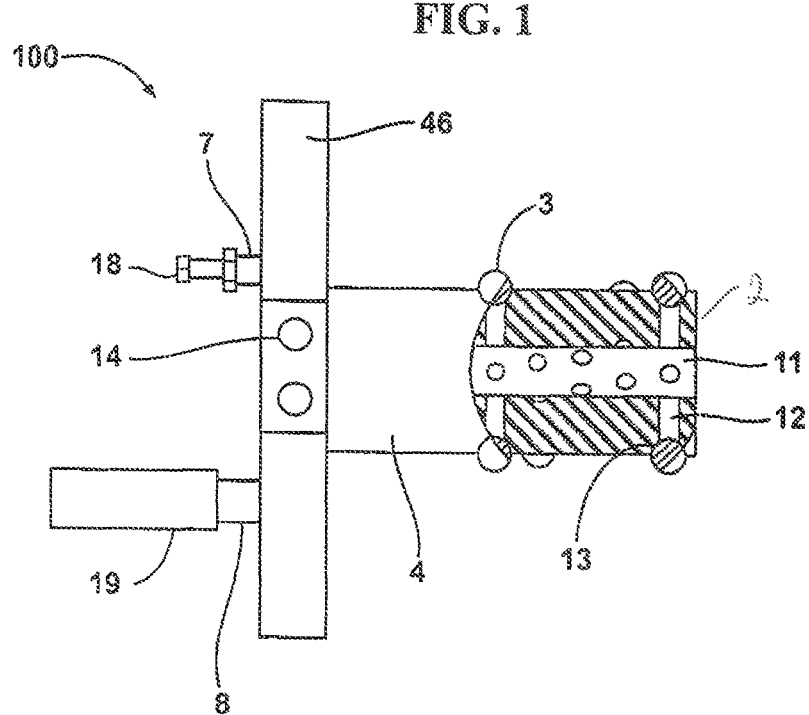
FIG. 2 is a side view of FIG. 1.

FIG. 2 is a side view of FIG. 1 and shows the incorporation of the ball bearings 3 and bearing cages 13 on the inner bearing cylinder 4. A bore 11 is formed into the end face 2 that communicates with a plurality bearing cages 13 that are connected through channels 12. A drive limiter stud and nut 18 are shown installed on drive limiter fitting 7. A position indicator device 19 is shown installed on position indicator fitting 8. The helical end housing assembly 100 may be mounted by using a plurality of mounts 14.

Figure 3:
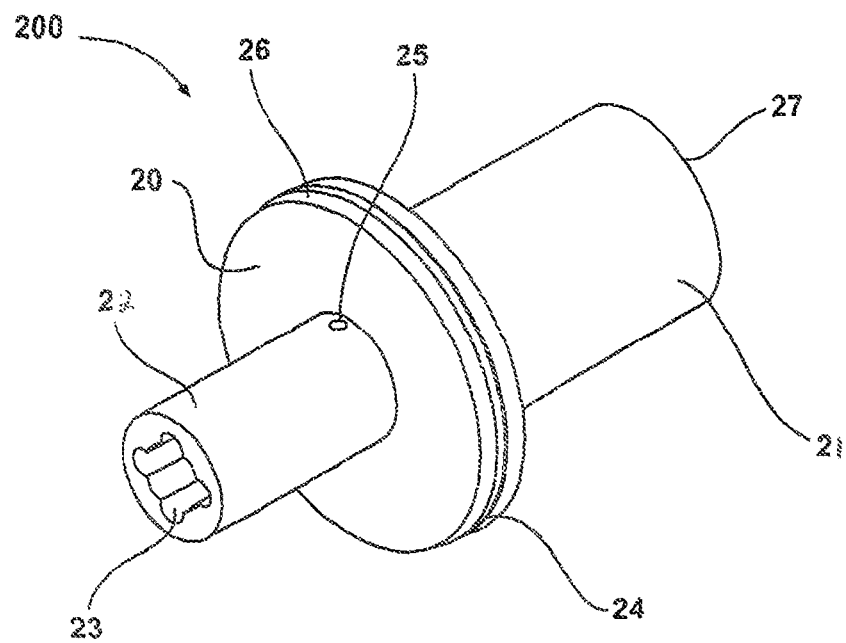
FIG. 3 is a perspective view of the revolution drive assembly.
Figure 4:
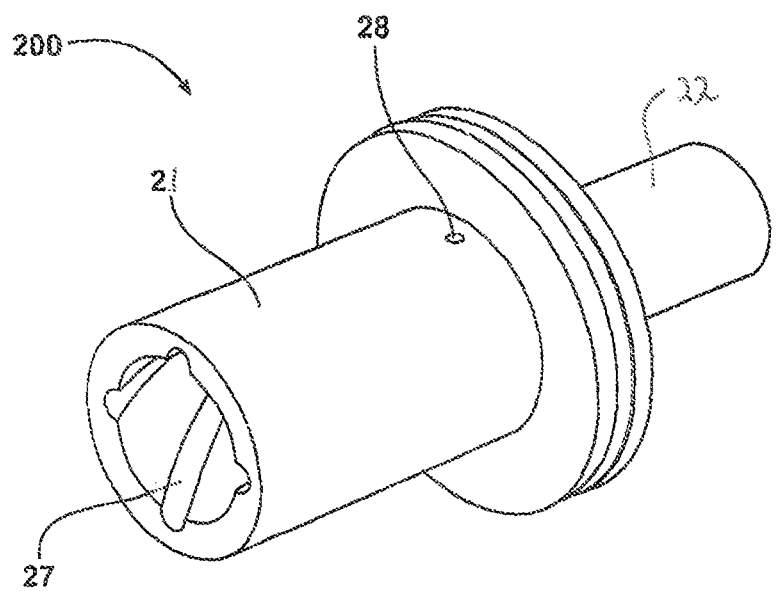
FIG. 4 is another perspective view of the revolution drive assembly showing the other end of the assembly.

FIG. 3 shows the revolution drive assembly 200. The revolution drive assembly 200 comprises a center portion 20 comprising a revolution piston 26 and a piston seal 24. A first end portion (or "first tubular portion") 21 is joined to one side of the revolution piston 26, and a second end portion (or "second tubular portion") 22 is joined to the other side of the revolution piston 26. The second tubular portion 22 has a center bore in which the outer bearing linear guide 23 is machined. The second tubular portion 22 also has a weep hole 25 formed therein. FIG. 4 shows the other end of the revolution drive assembly 200. The first tubular portion 21 of the revolution drive assembly 200 has a center bore in which an outer bearing helical guide 27 is machined. A weep hole 28 may also be formed in the first tubular portion 21. The outer diameter of the first tubular portion 21 may be greater than that of the second tubular portion 22.

Figure 5:
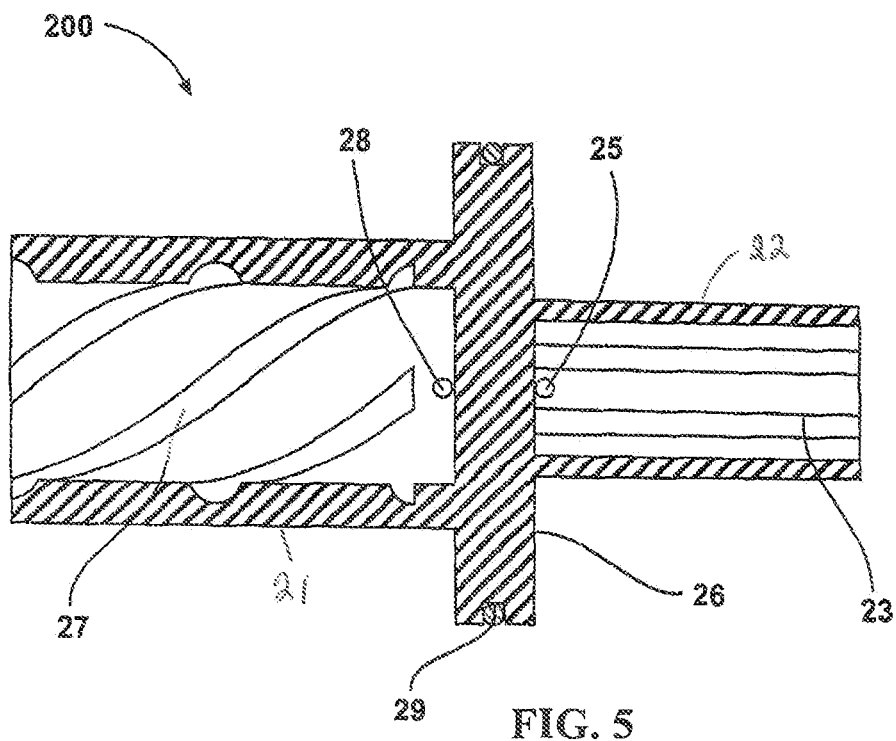
FIG. 5 is a cross-sectional view of the revolution drive assembly shown in FIG. 4.

FIG. 5 is a sectional cut away of the revolution drive assembly 200 further depicting the plurality internal grooves of the outer bearing helical guide 27 and the plurality of outer bearing linear guides 23 as well as the piston seal groove 29 on the revolution piston 26, along with weep hole 28 and weep hole 25.

Figure 6:
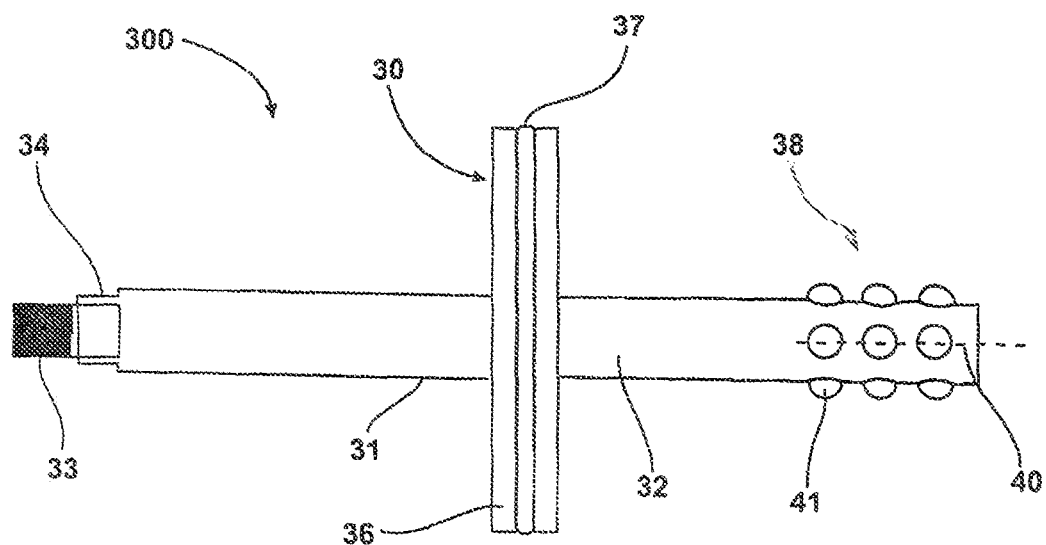
FIG. 6 is a side view of the linear drive assembly.

FIG. 6 is a side view of the linear drive assembly 300 and its elements. The linear drive assembly 300 comprises a center portion 30 comprising a linear piston 36 having a piston seal groove 37 formed therein. The linear drive assembly 300 comprises a first end portion 31 comprising a stem (or "output shaft" or "shaft") having a proximal end joined to one side of the linear piston 36 and extending toward and beyond the second end of the housing. The linear drive assembly 300 comprises a second end portion ("input shaft" or "linear drive cylinder") 32 in the form of a cylinder joined to and extending from the other side thereof toward the first end of the housing. The first end portion (output shaft) 31 has a distal end which may comprise a flat end 34 and/or a threaded end 33, or the like. The second end portion (input shaft) 32 comprises a portion 38 adjacent its distal end which comprises a plurality of bearings 41 formed on the outside surface thereof that are arranged along a plurality of spaced-apart longitudinally-oriented rows 40.

Figure 7:
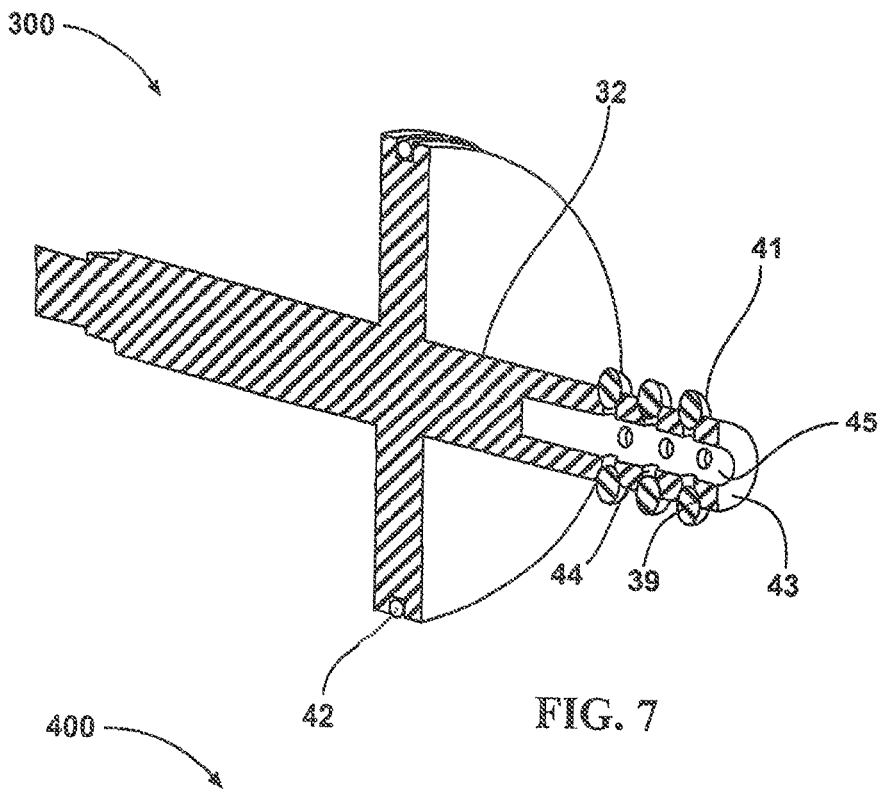
FIG. 7 is a perspective cross-sectional view of the linear drive assembly shown in FIG. 6.

FIG. 7 is a cut away perspective view of linear drive assembly 300 showing the plurality of ball bearings 41 and piston seal 42. The second end portion 32 has a face 43 in which a bore 45 is formed that communicates with a plurality of bearing races 39 using channels 44.

FIG. 8 shows the stem housing assembly 400. The stem housing assembly 400 comprises an outer portion (or second end cap) 50 having an opening such as inner bore 51 therein. The outer portion 50 attaches to one end of the cylindrical housing 60 as shown in FIGS. 10 and 11. The inner face of the outer portion 50 has a housing seal 57 thereon. The outer portion 50 is joined to the cylindrical housing 60 through housing attachment opening 58 using nuts and bolts or the like. The outer portion 50 has provision for position indicator fitting 52, drive limiter fitting 53, and a plurality of mounts 56. The inner bore 51 has provision for stem seal 55, stem wiper 54, and clip 59 that retains sealing material for the stem 35 shown in FIG. 6 that protrudes through the inner bore 51 opening. The stem housing assembly 400 may also comprise a drive limiter stud and nut 18 and position indicator 19 devices similar to those shown in FIG. 2.

FIG. 9 shows the LRA inner workings assembly 500 that comprises the helical end housing assembly 100, the revolution drive assembly 200, and the linear drive assembly 300, and the relationships between the same. The revolution drive assembly 200 is configured for rotational movement, and the revolution drive assembly 200 is configured for linear movement as shown by the arrows in FIG. 9.

FIG. 10 and FIG. 11 show the LRA assembly 600 which is comprised of cylindrical housing 60 including helical end housing assembly 100, revolution drive assembly 200, linear drive assembly 300, and stem housing assembly 400. The revolution piston 26 and the linear drive piston 36 divide the interior space into a plurality of chambers 66, 67, and 69. A first fitting ("revolution drive volume fitting") 63 is used to provide access to fill and drain revolution drive volume 66. A second fitting ("linear drive volume fitting") 61 is used to provide access to fill and drain linear drive volume 67, and third fitting ("center fitting") 62 is used to provide access to fill and drain center volume 69. Optional spring 64 is used to return the linear drive to normal inactive valve state. While not shown, a spring assist may also be utilized in the center volume 69 and revolution drive volume 66.

The improved LRA 600 has multiple elements disposed inside a cylindrical housing which are designed to provide separate chambers containing linear and rotational actuation elements. Additionally, elements are disposed outside of the cylindrical housing which allow for the mounting of the LRA and connection to its output shaft. The LRA can be used in a number of manners including, but not limited to those described below.

Figure 12:
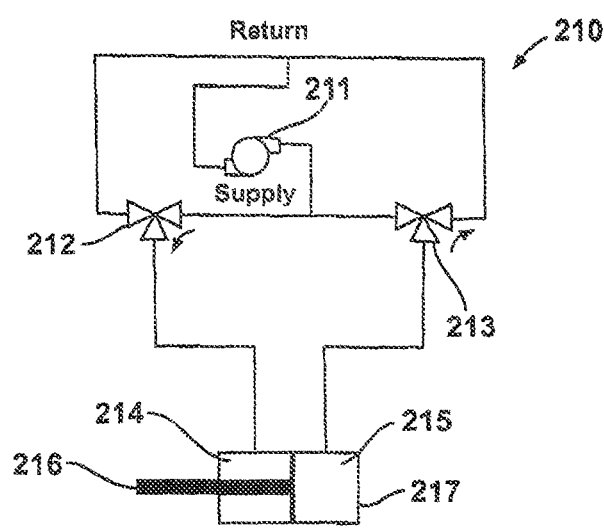
FIG. 12 is a schematic piping diagram of a conventional actuator.

FIG. 12 shows a schematic piping diagram for a conventional actuator 210. As shown in FIG. 12, an actuator fluid supply generated by pump 211 is routed through either valve 212 or valve 213 depending or selected position of valves. If valve 212 is used for supplying conventional actuator 217, then valve 213 provides return flow as these two valves operate together. Fluid supplied to valve 212 as shown by the arrow is routed to volume 214 of conventional actuator 217. Simultaneously, the contents of volume 215 are routed through valve 213 as shown by the arrow to the return side of pump 211 and flow is isolated on return leg of valve 212. This causes actuator stem 216 to move to the right in FIG. 12. To move the actuator stem 216 in the opposing direction, pump 211 is routed through valve 213 to volume 215 with the contents of volume 214 routed to the return side of pump 211.

Figure 13:
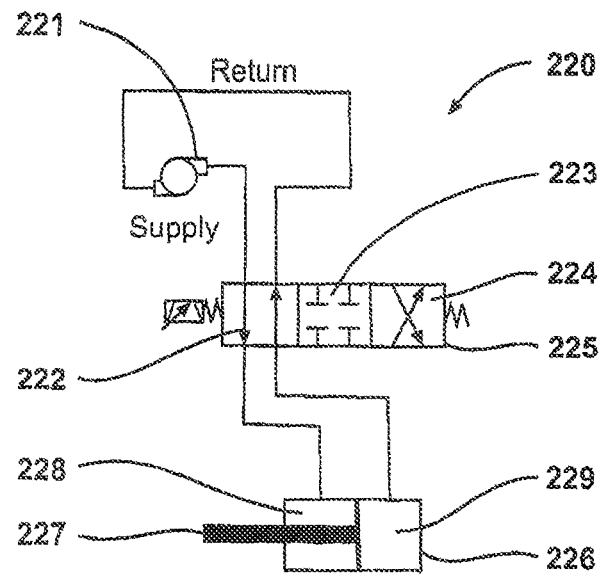
FIG. 13 is a schematic piping diagram of conventional servo controlled actuator.

FIG. 13 depicts a schematic piping diagram for a conventional servo controlled actuator 220. Actuator fluid supplied by pump 221 is routed through servo valve 225 which is shown to have three positions 222, 223 and 224, in which the actuator fluid can be routed. Position 223 represents the neutral position of the servo valve 225 when no movement of conventional actuator 226 is required. Once a desired direction is selected for servo valve 225, as depicted in diagram as position 222, the control system provides the appropriate electrical command to proportionally move the servo valve 225 internal components. This directs actuation fluid from pump 221 to volume 228 of conventional actuator 226, moving actuator stem 227 to the right while simultaneously routing fluid from volume 229 through the return circuit of servo valve 225 position 222 and finally to return side of pump 221. To create opposing actuator stem 227 motion, servo valve position 224 is selected, pump 221 fluid is routed to volume 229 of conventional actuator 226 and the contents of volume 228 are routed to return side of pump 221.

Figure 14:
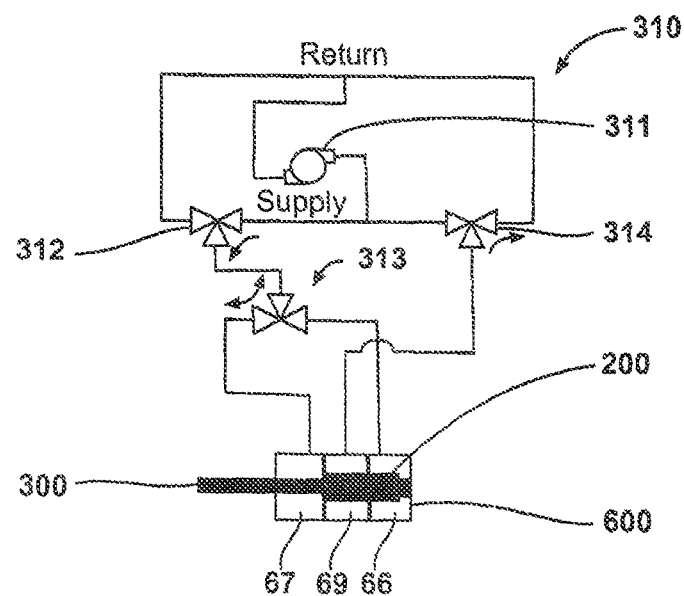
FIG. 14 is a schematic piping diagram of the improved LRA open and close actuator.

FIG. 14 represents a schematic piping diagram of the improved LRA open and close actuator 310. Fluid actuation source from pump 311 is routed to either valve 312 or valve 314 depending or selected position of valves. As in a conventional actuator, these two valves operate together and provide either supply or return circuit flow. When supply flow is routed through valve 312, the actuation fluid has an additional valve 313 to direct or isolate flow to linear and rotary actuator 600. As shown, valve 313 has isolated volume 66 of linear and rotary actuator 600 while allowing supply to volume 67 and the return of fluid content in volume 69. This creates linear motion in linear drive assembly 300. When valve 313 is commanded, volume 67 is isolated and supply fluid is directed to volume 66 while returning fluid contents from volume 69. This rotates linear drive assembly 300 of linear and rotary actuator 600 by coordinated movement of revolution drive assembly 200. To create opposing rotational or linear motion, actuation fluid is supplied through valve 314, while returning fluid through valve 312 and using valve 313 to either isolate or return linear and rotary actuator 600 fluid contents from volumes 67 or 66. If contents of volume 67 are returned, this creates linear motion on linear drive assembly 300. If contents of volume 66 are returned, this generates movement of revolution drive assembly 200 causing rotational motion on linear drive assembly 300.

Figure 15:
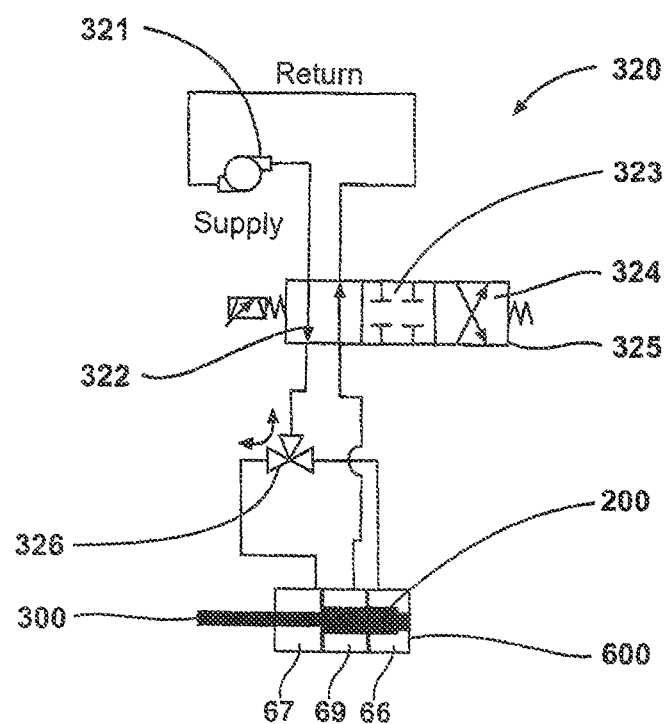
FIG. 15 is a schematic piping diagram of the improved LRA servo controlled actuator.

FIG. 15 is a schematic piping diagram of the improved LRA servo controlled actuator 320. Actuator fluid supplied by pump 321 is routed through servo valve 325 which is shown to have three positions 322, 323 and 324, in which supply and return actuator fluid can be routed. Position 323 represents the neutral position of the servo valve 325 when no movement of linear and rotary actuator 600 is required. Once a desired direction is chosen, shown as servo valve position 322, the control system provides appropriate electrical command to proportionally move the servo valve 325 internal components, directing supply actuation fluid through valve 326 to volume 67 of linear and rotary actuator 600, creating linear motion on linear drive assembly 300. This simultaneously routes fluid from volume 69 through the return circuit of servo valve 325 position 322 and finally to return side of pump 321. While retaining servo valve 325 position 322 and commanding valve 326 isolating volume 67 and routing supply fluid to volume 66 of linear and rotary actuator 600, moves revolution drive assembly 200 creating rotational motion on linear drive assembly 300. To create opposing linear and rotational motions, servo valve 325 position 324 is selected. Pump 321 supplied actuation fluid is routed to volume 69 and return flow is routed through valve 326 which provides isolation or return flow from volume 67 or 66. When the contents flow from volume 67, linear motion is created on linear drive assembly 300. When contents flow from volume 66, the revolution drive assembly 200 creates rotational motion on linear drive assembly 300 of linear and rotary actuator 600.

Hydraulic fluids or other high bulk modulus fluids are typically used in the applications shown in FIG. 14 and FIG. 15. Prior to use, the volumes are usually bled in to ensure the system is hardened. The high bulk modulus keeps the locked off volume confined with minimal shaft displacement changes when a pressure differential exist between the locked volume and the opposing side of the locked volume piston. The control of this minimal volume change can be done in the mechanical calibration of the valve, or in the control system calibration. Or if required, a servo valve could be used in place of valve 313 in FIG. 14 or valve 326 in FIG. 15 to more precisely control the rate of flow in to or out of the locked volumes.

The improved linear and rotary actuator 600 has a separate chamber on one side of the piston and a common shared chamber 69 on the other side of the piston. Center volume 69 can be considered to be a shared chamber since it is plumbed to only one port on a valve, while volumes 66 and 67 are both plumbed to two different ports on the same valve. This configuration minimizes the overall length of the actuator 600. The actuating fluid plumbing (shown in FIGS. 12-15) is routed such that during operation, it can take advantage of this configuration to minimize the amount of componentry used. A design that does not have a common chamber would require additional actuation fluid plumbing and components to operate.

During the operation the actuator 600, the helical end housing assembly 100 may be joined to a mounting fixture. This allows relational movement of revolution drive assembly 200 and linear drive assembly 300 as described in FIGS. 14 and 15. The novel features of the linear and rotary actuator 600 reduce the frictional component while retaining a tight inference tolerance during operation. As seen in FIG. 9, the revolution drive assembly 200 and helical end housing 100 form an insertable assembly aligned by the ball bearings 3 and outer bearing helical guide 27. Upon movement, fluid in bore 11 shown in FIG. 2 is pressurized and distributed through a plurality of channels 12 to bearing cages 13. This pressurizes the ball bearings 3 providing additional lubrication in conjunction with the hydrostatic like bearing effect to reduce friction during operation. Again referring to FIG. 9, the revolution drive assembly 200 and linear drive assembly 300 form an insertable assembly aligned by the ball bearings 41 and outer bearing linear guide 23 shown in FIG. 3. During linear operations, the fluid in the bore 45 shown in FIG. 7 is pressurized and distributed through a plurality of channels 44 to bearing cages 39. This pressurizes the ball bearings 41 providing additional lubrication in conjunction with the hydrostatic like bearing effect to reduce friction during operation.

In other embodiments, a plurality of improved linear rotary actuators 600 can be operated with the operational schematics shown in FIG. 14 and FIG. 15.

Figure 16:
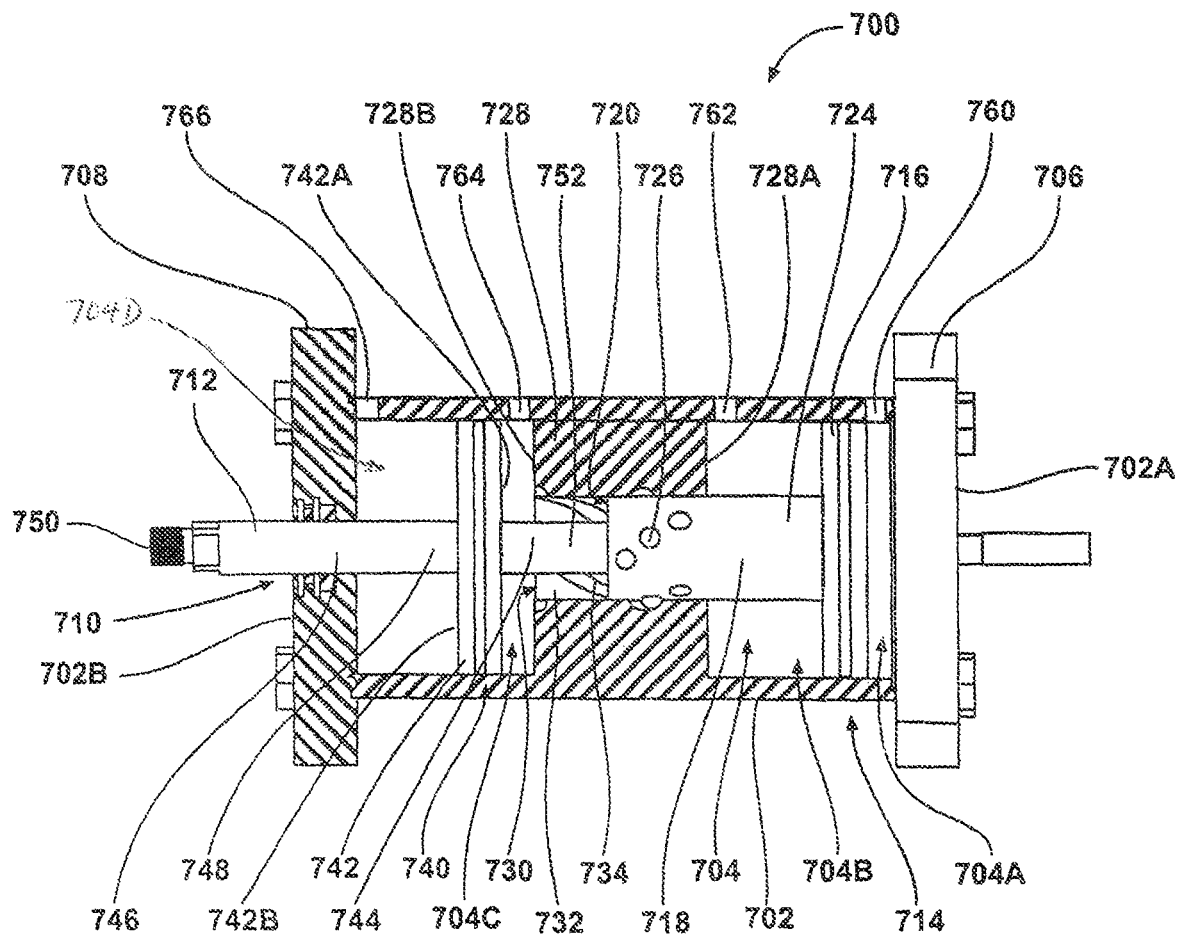
FIG. 16 is an alternative embodiment in which the revolution drive is incorporated into the cylindrical housing.

FIG. 16 is an alternative embodiment of combined linear and rotary actuator 700 that differs in several respects from the previous embodiment. The linear and rotary actuator 700 comprises a housing 702 defining a cylindrical interior space 704, a first end cap 706 at a first end 702A of the housing and a second end cap 708 at a second end 702B of the housing. The second end cap 708 has an opening 710 therein for an output shaft 712. In this alternative embodiment, an inner bearing cylinder assembly 714 is provided that is not joined to the first end cap 706, but rather is movable with respect to the first end cap 706. The inner bearing cylinder assembly 714 comprises an inner bearing piston 716 and an inner bearing cylinder (or "helical drive shaft") 718 joined to the inner bearing piston 716. The inner bearing cylinder 718 extends into the interior space 704 toward the second end of the housing. The inner bearing cylinder 718 has an interior surface 720 with longitudinally-oriented grooves therein (similar to the outer bearing linear guide 23 of the prior embodiment) and an outer surface 724 with a plurality of spaced apart ball bearings 726 arranged in a helical pattern extending partially outward from its outer surface 724.

The embodiment shown in FIG. 16 differs from the prior embodiment in that it comprises a revolution drive divider section 728 in the housing 702. The revolution drive divider section 728 has two sides 728A and 728B and a generally cylindrical passageway 730 extending between the sides 728A and 728B of the divider section. The passageway 730 has an interior surface 732 that defines the passageway, with helical grooves 734 therein. The inner bearing cylinder 718 is positioned so that it extends at least part of the way into the generally cylindrical passageway 730 of the revolution drive divider section 728 where the ball bearings 726 in the helical pattern engage with the helical grooves 734.

The embodiment shown in FIG. 16 has a linear drive assembly 740 slidably mounted in the housing 702. The linear drive assembly 740 comprises: a linear drive piston 742 having two sides 742A and 742B; a linear drive cylinder 744 extending from a first side of the linear drive piston 742 toward the first end of the housing; and a shaft 746 extending from its proximal end 748 adjacent the second side 742B of the linear drive piston to a distal end 750. The linear drive cylinder 744 has an outer surface 752 with a plurality of ball bearings 756 arranged in spaced apart, longitudinally-oriented rows extending partially outwardly therefrom. The linear-oriented ball bearings 756 are hidden in FIG. 16, but are partially visible in the double-ended actuator variation of this embodiment shown in FIG. 17. The ball bearings 756 are located on the linear drive cylinder 744 which is concentrically inserted into the open end of the inner bearing cylinder 718. The mating grooves (hidden in this view) are located on the interior surface 720 of the inner bearing cylinder 718. The thickness or size of the bearings and grooves are such that sufficient material exists between the inner and outer diameter of the inner bearing cylinder 718 to avoid any entanglement or interference. Also, the bearing cages that retain the bearings 726 in the desired locations (like those shown in FIG. 2) are not through holes, but rather are hemispherical. Any hydrostatic lubrication channels would be sufficiently smaller than the bearing diameters to avoid issues. The hydrostatic lubrication channels could be on the inner linear drive cylinder 744 if clearance is a problem.

The linear drive cylinder 744 is inserted into the generally cylindrical passageway 730 of the revolution drive section 728 and is slidably mounted inside of the inside surface of the inner bearing cylinder 718. The shaft 746 of the linear drive assembly 740 extends through the opening 710 in the second end cap 708 and beyond the second end 702B of the housing.

The revolution drive divider section 728 divides the interior space 704 into two chambers. One chamber is labeled with reference numbers 704A and 704B. The other chamber is labeled with reference numbers 704C and 704D. The housing 702 has fluid passageways 760, 762, 764, and 766 with fittings for each of the chambers to permit pressurized fluid to flow into and out of each of the chambers on either side of the inner bearing piston 716 and the linear drive piston 742 to facilitate movement of the pistons, which will in turn cause linear and/or rotational movement of the shaft 712. Thus, the two chambers on either side of the revolution drive divider section 728 may each be considered to be further divided into separate inner and outer chambers by the pistons 716 and 742 therein. The chambers 704A/704B and 704C/704D may, at least in some cases, be considered to be independent. However, the two inner chambers 704B and 704C on either side of the revolution drive divider section (the center chambers) may or may not communicate depending on the sealing package and/or the bearing/groove tolerance. For example, there could be some fluid communication across any small bearing and groove gaps and/or weep holes from side 728 A to and/or from side 728B of the revolution drive divider. Fluid flow control into ports 762 and 764 could manage any issues. Fluid control to these center inner chambers 704B and 704C can be facilitated by the fluid plumbing and components to control fluid flow rates into or out of the chambers depending on the bleed rate across the helical section and/or the weep holes.

Notwithstanding the differences described above, the alternative combined linear and rotary actuator 700 shown in FIG. 16 may have any of the other features of the previous embodiment including, but not limited to the weep holes, and the stem seal, stem wiper, and clip around the output shaft 712.

Figure 17:
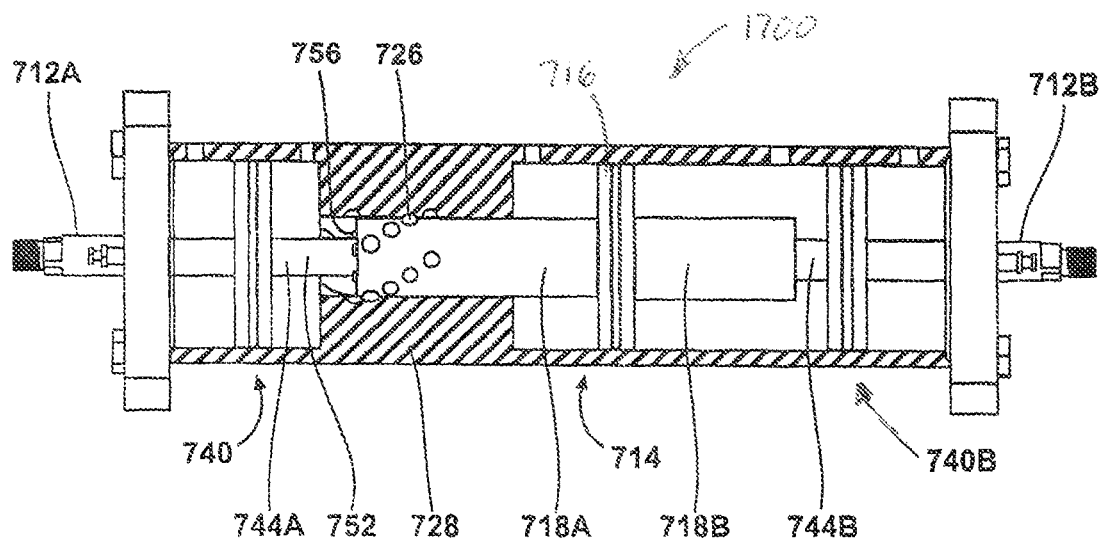
FIG. 17 is an alternative embodiment depicting the embodiment of FIG. 16 configured into a double-ended actuator.

FIG. 17 is an alternative embodiment depicting the embodiment of FIG. 16 configured into a double-ended actuator 1700. The components of the double-ended actuator 1700 comprise the same components as the single-ended actuator 700 shown in FIG. 16. The left hand portion of the double-ended actuator 1700 is the same as the actuator 700 shown in FIG. 16, and its components in common with actuator 700 are labeled similarly to those in FIG. 16, followed by the letter A. The right hand portion of the double-ended actuator 1700 is a modified mirror image of the left hand portion. The components of the right hand portion are labeled similarly to those of the left hand portion, followed by the letter B. (There may be exceptions for those elements in FIG. 16 that are currently designated by reference numbers followed by the letter A or B.) One modification in the right hand portion is that there is no corresponding revolution divider section 728 on the right hand portion of the double-ended actuator 700. Another modification is that the outer surface of the inner bearing cylinder 718B on the right hand portion of the double-ended actuator 1700 does not have any ball bearings arranged in a helical pattern thereon. The linear drive assembly 740B on the right side of this double ended actuator 1700 does, however, have a shaft 744B with linearly-oriented rows of ball bearings thereon, but the linearly-oriented ball bearings are not visible because the end of the shaft 744B is inserted in the right hand inner bearing cylinder 718B. It should be understood that any references to the directions left and right herein are only with reference to the drawing figures, and are not limitations on the linear and rotary actuators described herein.

The double-ended actuator 1700 shown in FIG. 17 comprises a housing having a longitudinal axis, a first end, and a second end. The housing defines a cylindrical interior space, and has an opening in its first end and an opening in its second end. While either end could be considered a first end or a second end, for the purposes of discussion, the first end of the housing will be considered to be the end of the housing on the right side of FIG. 17, and the second end of the housing will be considered to be the end of the housing on the left side of FIG. 17.

The double-ended actuator 1700 comprises a revolution drive divider section 728 in the housing. The revolution drive divider section 728 has a first side, a second side, and a generally cylindrical passageway extending along the longitudinal axis of the housing between the first and second sides of the revolution drive divider section. The passageway has an interior surface with helical grooves therein.

A revolution piston (or "inner bearing piston") 716 is positioned between the revolution drive divider section 728 and the first end of the housing. The revolution piston 716 is configured to move longitudinally while rotating inside the housing. The revolution piston 716 has a first surface and a second surface. The terms "first surface" or "first side" may be used herein to refer to surfaces that face the first end of the housing. The terms "second surface" or "second side" may be used to refer to surfaces that face the second end of the housing.

An inner bearing cylinder 718A is joined to the second surface of the revolution piston. The inner bearing cylinder 718A extends toward the second end of the housing. The inner bearing cylinder 718A has an interior surface with longitudinally-oriented grooves therein and an outer surface with a plurality of spaced-apart ball bearings distributed in a helical pattern thereon. The inner bearing cylinder 718A is positioned so that it extends at least part of the way into the generally cylindrical passageway of the revolution drive divider section 728 wherein the ball bearings in the helical pattern engage with the helical grooves in the passageway of the revolution drive divider section 728.

A second cylinder 718B is joined to the first surface of the revolution piston 716. The second cylinder 718B extends toward the first end of the housing. The second cylinder 718B has a generally cylindrical interior space having a surface with longitudinally-oriented grooves therein.

A first linear drive assembly 740 is slidably mounted in the housing. The first linear drive assembly 740 comprises a first linear drive piston having two sides, and a first linear drive cylinder 744A extending from a first side of said linear drive piston toward the first end of said housing. The first linear drive cylinder 744A has an outer surface with a plurality of ball bearings arranged in spaced apart, longitudinally-oriented rows extending partially outwardly therefrom. The first linear drive cylinder 744A is inserted into the generally cylindrical passageway of the revolution drive divider section 728 and is slidably mounted inside of the inside surface of the inner bearing cylinder 718A. A first output shaft 712A extends from a proximal end that is adjacent to a second side of the first linear drive piston to a distal end that extends through and beyond the opening in the second end of the housing.

A second linear drive assembly 740B is slidably mounted in the housing between the first end of the housing and the revolution drive divider section 728. The second linear drive assembly 740B is located between the revolution piston 716 and the first end of the housing. The second linear drive assembly 740B comprises a second linear drive piston having two sides, and a second linear drive cylinder 744B extending from the second side of the second linear drive piston toward the second end of the housing. The second linear drive cylinder 744B has an outer surface with a plurality of ball bearings arranged in spaced apart, longitudinally-oriented rows extending partially outwardly therefrom. The second linear drive cylinder 744B is inserted into the interior space of the second cylinder 718B to engage with the longitudinally-oriented grooves therein and is slidably mounted therein. A second output shaft 712B extends from a proximal end located adjacent the first side of the second linear drive piston to a distal end that extends through and beyond the opening in the first end of the housing.

The revolution piston 716, the revolution drive divider section 728, and the linear drive pistons divide the interior space into a plurality of chambers. The housing has a fluid passageway for each of the chambers to permit pressurized fluid to flow into and out of each of the chambers to facilitate movement of the pistons, which will in turn cause linear and/or rotational movement of the output shafts.

Figure 18:
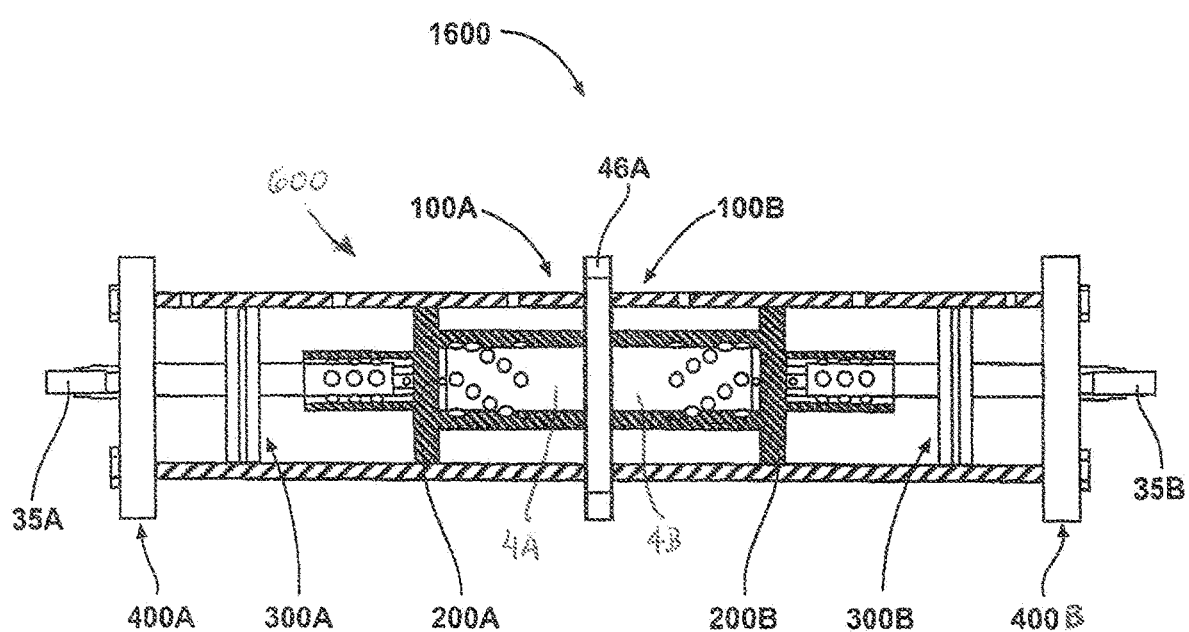
FIG. 18 is an alternative embodiment depicting the embodiment shown in FIG. 10 configured into a double-ended actuator.

FIG. 18 is an alternative embodiment depicting the embodiment shown in FIG. 10 configured into a double-ended actuator 1600. The components of the double-ended actuator 1600 comprise the same components as the single-ended actuator 600 shown in FIG. 10. The left hand portion of the double-ended actuator 1600 is the same as the actuator 600 shown in FIG. 10, and its components are labeled similarly to those in FIGS. 1-11, followed by the letter A. The right hand portion of the double-ended actuator 1600 is a mirror image of the left hand portion. The components of the right hand portion are labeled similarly to those of the left hand portion, followed by the letter B. In this case, however, the first end cap 46A of the actuator 600 on the left side of FIG. 18 can be considered to be an intermediate member that is positioned approximately midway between said first and second ends of the housing. The intermediate member 46A has a first surface and a second surface, and divides the interior space of the housing of the double-ended actuator 1600 into two portions.

The double-ended actuator 1600 shown in FIG. 18 comprises a housing having a first end and a second end. The housing defines a cylindrical interior space and has an opening in its first end and an opening in its second end. While either end could be considered a first end or a second end, for the purposes of discussion, the first end of the housing will be considered to be the end of the housing on the right side of FIG. 18, and the second end of the housing will be considered to be the end of the housing on the left side of FIG. 18.

As discussed above, an intermediate member 46A is positioned approximately midway between the first and second ends of the housing that divides the interior space of the housing into a first portion and a second portion. The intermediate member 46A has a first surface facing the first end of the housing and a second surface facing the second end of the housing.

A first pair of pistons is located inside a first portion of the cylindrical interior space between the intermediate member 46A and the second end of the housing. The first pair of pistons comprise a first revolution piston and a first linear drive piston. The first revolution piston comprises part of first revolution drive assembly 200A. The first revolution piston is configured to move longitudinally while rotating inside the housing. A first inner bearing cylinder 4A is joined to the second surface of the intermediate member 46A and is in operative communication with the first revolution piston. The first inner bearing cylinder 4A has an outer surface with a plurality of spaced-apart ball bearings distributed in a helical pattern thereon. The ball bearings engage with a first structure in the housing having an inner surface with helical grooves therein. In this embodiment, the first structure having an inner surface with helical grooves comprises a first tubular portion extending from a first side of the revolution piston, which tubular portion fits over the first inner bearing cylinder 4A and is rotatable thereon.

The first linear drive piston is part of the first linear drive assembly 300A. The first linear drive piston has a first surface and a second surface and is slidably mounted in the housing. A first input shaft is joined to the first surface of the first linear drive piston. The first input shaft comprises part of the first linear drive assembly 300A. The first input shaft has ball bearings arranged in a linear pattern on its surface. The first input shaft is inserted inside a first cylindrical component that has an inner surface with linear grooves. In this embodiment, the first cylindrical component comprises a second tubular portion that extends from a second side of the revolution piston.

A second pair of pistons is located inside a second portion of the cylindrical interior space between the intermediate member 46A and the first end of the housing. The second pair of pistons comprises a second revolution piston and a second linear drive piston. The second revolution piston comprises part of second revolution drive assembly 200B. The second revolution piston is configured to move longitudinally while rotating inside the housing. A second inner bearing cylinder 4B is joined to the first surface of the intermediate member 46A and is in operative communication with the second revolution piston. The second inner bearing cylinder 4B has an outer surface with a plurality of spaced-apart ball bearings distributed in a helical pattern thereon. The ball bearings engage with a second structure in the housing having an inner surface with helical grooves therein. In this embodiment, the second structure having an inner surface with helical grooves comprises a second tubular portion extending from the second side of the revolution piston, which tubular portion fits over the second inner bearing cylinder 4B and is rotatable thereon.

The second linear drive piston is part of the second linear drive assembly 300B. The second linear drive piston has a first surface and a second surface and is slidably mounted in the housing. A second input shaft is joined to the second surface of the second linear drive piston. The second input shaft comprises part of the second linear drive assembly 300B. The second input shaft has ball bearings arranged in a linear pattern on its surface. The second input shaft is inserted inside a second cylindrical component that has an inner surface with linear grooves. In this embodiment, the second cylindrical component comprises a second tubular portion that extends from the first side of the revolution piston.

The double-ended actuator 1600 shown in FIG. 18 further comprises a first output shaft 35A and a second output shaft 35B. The first output shaft has a proximal end joined to the second surface of the first linear drive piston and a distal end extending through an opening in the second end of the housing. The second output shaft has a proximal end joined to the first surface of the second linear drive piston and a distal end extending through an opening in the first end of the housing. The pistons divide the interior space of the housing into a plurality of chambers, wherein the housing has a fluid passageway for each of the chambers to permit pressurized fluid to flow into and out of each of the chambers to facilitate movement of the pistons, which will in turn cause linear and/or rotational movement of the output shafts.

The design of the improved LRA ensures that the cylindrical housing and internal elements are dimensioned such to fit appropriately, provide leak tight fluid containment, and promote assembly and disassembly.

The cylindrical housing, helical end and stem end closures, linear drive device, revolution drive device, can all be made using conventional technologies (e.g., casting, machining, etc.), or additive manufacturing technologies. The components of the LRA can be made of any suitable materials including but not limited to metals, such as stainless steel. Sealing O-rings, sealing materials, bearings, retaining bolts, studs and nuts can be made of materials commonly used for such components.

The following describes one embodiment of making the components of the LRA by machining the same. The helical end housing 100 has a machined profile formed with an outer flange and a smaller diameter shaft protruding away from the outer flange. The helical end housing 100 incorporates a revolution drive device travel limiter 7, electronic position indication receptacle 8 and cylindrical housing attachment with sealing groove. The smaller diameter shaft forms the inner bearing cylindrical shaft 4 and is directed inward into the cylindrical housing. This inner bearing cylinder shaft 4 incorporates a plurality of machined ball bearing cages 13 matched machined with appropriate tolerance along a matching number of helical curves 6 that engage with the revolution drive device 200. On the end face 2 of the inner bearing shaft 4 is a machined bore 11. The machined bore 11 connects a plurality of drilled channels 12 to the bearing cages 13.

The revolution drive device 200 is machined from material that can provide a center piston 26 with sealing groove 29 and two smaller diameter shafts located on either side of the piston. One shaft 22 has a number of internally machined curved profile helical grooves 27 that match the helical curve profile located on the helical end housing inner bearing cylindrical shaft 4. The opposing shaft 21 of the revolution drive device 200 is composed of a number of linear machined grooves 23 matched machined to ensure communication with the linear drive device 300 ball bearing end. Additional machining is performed to incorporate helical drive piston sealing groove 29 and machined weep holes 25 and 28 on each shaft to allow for fluid pressure balancing of the hydrostatic like bearing functionality during movement.

The linear drive device 300 is machined from material that provides a center piston 36 and two smaller shafts 31 and 32 on opposing sides of the piston. One shaft end 38 has a plurality of machined ball bearing cages with appropriate tolerance to matched to couple with the linear end 21 of the revolution drive device 200. As shown in FIG. 7, on the face 43 of the shaft end is a machined bore 45 in which a plurality of drilled channels 44 connect to the bearing cages. The other shaft 31 has an actuator stem threaded connection 33 or the like and is machined to sufficient length to exit the end of the stem housing assembly 400 and stem seals 55 and stem wipers 54. Additional machining is performed to incorporate linear drive piston seal groove 37.

The stem end housing 400 is machined to ensure provisions for a stem seal closeout seals and wiper 54, mounting supports 56, linear device travel limiter, electronic position indication and cylindrical housing attachment with sealing groove.

While the preferred embodiment describes metallic composition for a substantial number of the parts, the invention is not limited by the material used for its component parts.

The linear and rotary actuators described herein may have a number of features. The linear and rotary actuators use hydrostatically charged integral bearing races which activate during mechanized actuator operation to reduce friction. A single actuator piston may independently provide rotational shaft motion upon linear displacement of the piston. A single actuator piston may independently provide linear shaft motion upon linear displacement of the piston. The actuator pistons are contained within a single housing. The actuator pistons may share a common fluid chamber. This minimizes the overall length of the actuator, and reduces the number of actuation fluid components require to operate the same. The actuator pistons can be operated independently or in synchronicity (synchronously). In embodiments having a helical end housing cap, the helical end housing cap interfaces with helical drive device first end and retains the alignment of the helical drive during the actuator piston movement. Linear and helical drive devices may be retained in a housing with a common fluid chamber. One end of the linear drive device is aligned with the second end of the helical drive device. The other end of the linear device exits housing end cap with seals allowing for the displacement of a shaft external of the housing.

The linear and rotary actuators described herein can provide a number of advantages. It should be understood, however, that these advantages need not be required unless they are set forth in the appended claims. The linear and rotary actuators can control linear and rotational output shaft motion in combination or individually. The linear and rotary actuators use a hydrostatically charged integrated bearing cage arrangement to reduce actuator friction and pressure levels required for actuation. The linear and rotary actuators use integral bearing races and ball bearings as guides to retain precise shaft tolerance reducing stem play. The linear and rotary actuators require minimal changes from conventional actuating fluid circuitry to achieve the complex motion. The linear and rotary actuators can utilize existing fluid control devices such as multi-way servo control valve or solenoid operating valves. The linear and rotary actuators may be considered to have a separate chamber on one side of the piston and a common shared chamber on the other side of the piston. This configuration minimizes the overall length of the actuator. The actuating fluid plumbing (shown in FIGS. 12-15) may be routed so that during operation it can take advantage of this configuration to minimize the amount of actuation fluid plumbing and componentry used.

The terms "join" and "joined", as used herein, encompass configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A combination linear and rotary actuator comprising:
    a housing having a first end and a second end, and defining a cylindrical interior space;
    a pair of pistons located inside the cylindrical interior space, said pistons comprising:
        a revolution piston configured to move longitudinally while rotating inside said housing, an inner bearing cylinder in operative communication with said revolution piston and having an outer surface with a plurality of spaced-apart ball bearings distributed in a helical pattern thereon, wherein said ball bearings engage with a structure in said housing having an inner surface with helical grooves therein; and
        a linear drive piston having a first surface and a second surface that is slidably mounted in the housing having an input shaft joined to said first surface, said input shaft having ball bearings arranged in a linear pattern on its surface, which input shaft is inserted inside a cylindrical component that has an inner surface with linear grooves;
    an output shaft having a proximal end joined to the second surface of said linear drive piston and a distal end extending through an opening in the second end of the housing,
    wherein said revolution piston and said linear drive piston divide said interior space into a plurality of chambers, wherein said housing has a fluid passageway for each of said chambers to permit pressurized fluid to flow into and out of each of said chambers to facilitate movement of said pistons, which will in turn cause linear and/or rotational movement of said output shaft.

2. The combination linear and rotary actuator of claim 1 wherein said structure having an inner surface with helical grooves therein comprises a first tubular portion extending from a first side of said revolution piston, wherein said first tubular portion fits over said inner bearing cylinder and is rotatable thereon.

3. The combination linear and rotary actuator of claim 2 wherein said cylindrical component that has an inner surface with linear grooves comprises a second tubular portion extending from a second side of said revolution piston.

4. The combination linear and rotary actuator of claim 3 wherein said inner bearing cylinder is joined to the first end of the housing and extends into said interior space toward the second end of the housing.

5. The combination linear and rotary actuator of claim 1 wherein said housing has a longitudinal axis, and said structure having an inner surface with helical grooves therein comprises a revolution drive divider section that extends perpendicular to the longitudinal axis of the housing and divides the interior space of said housing, said revolution drive divider section having two sides and a generally cylindrical passageway extending longitudinally between the sides of said divider section.

6. The combination linear and rotary actuator of claim 5 wherein said inner bearing cylinder is joined to said revolution piston and said inner bearing cylinder has an interior surface with longitudinally-oriented grooves therein which comprises said cylindrical component that has an inner surface with linear grooves.

7. The combination linear and rotary actuator of claim 1 wherein said inner bearing cylinder has a plurality of interior channels therein that are in fluid communication with said ball bearings and with the fluid inside at least one of said chambers during operation to reduce friction during movement.

8. The combination linear and rotary actuator of claim 1 wherein said input shaft has a plurality of interior channels therein that are in fluid communication with said ball bearings and with the fluid inside at least one of said chambers during operation to reduce friction during movement.

9. The combination linear and rotary actuator of claim 1 wherein said linear drive piston and said revolution piston share a common fluid chamber.

10. The combination linear and rotary actuator of claim 1 further comprising a spring positioned between the second end of said housing and the linear drive piston.

11. A combination linear and rotary actuator comprising:
a housing defining a cylindrical interior space, said housing comprising a first end cap at a first end of the housing and a second end cap at a second end of the housing, said second end cap having an opening therein;
an inner bearing cylinder extending into said interior space, said inner bearing cylinder having an outer surface with a plurality of spaced apart ball bearings arranged in a helical pattern extending partially outward from said outer surface;
a revolution drive assembly rotationally mounted in said housing, said revolution drive assembly comprising: a revolution piston having two sides; a first tubular portion extending from a first side of said revolution piston, said first tubular portion having an interior surface with helical grooves therein, wherein said first tubular portion fits over said inner bearing cylinder and is rotatable thereon; a second tubular portion extending from a second side of said revolution piston, said second tubular portion having an interior surface with longitudinally-oriented grooves therein;
a linear drive assembly slidably mounted in said housing, said linear drive assembly comprising: a linear drive piston having two sides; a linear drive cylinder extending from a first side of said linear piston toward the first end of said housing, wherein said linear drive cylinder has an outer surface with a plurality of ball bearings arranged in spaced apart, longitudinally-oriented rows extending partially outwardly therefrom, wherein said linear drive cylinder is slidably mounted inside said second tubular portion of said revolution drive assembly; and a shaft extending from a proximal end adjacent a second side of said linear piston to a distal end that extends through the opening in the second end cap and beyond the second end of the housing,
wherein said revolution piston and said linear drive piston divide the interior space into a plurality of chambers, wherein said housing has a fluid passageway for each of said chambers to permit pressurized fluid to flow into and out of each of said chambers to facilitate movement of said pistons, which will in turn cause linear and/or rotational movement of said shaft.

12. The combination linear and rotary actuator of claim 11 wherein the inner bearing cylinder is joined to the first end cap.

13. A combination linear and rotary actuator comprising:
a housing defining a cylindrical interior space, said housing comprising a first end cap at a first end of the housing and a second end cap at a second end of the housing, said second end cap having an opening therein;
an inner bearing cylinder assembly comprising an inner bearing piston and an inner bearing cylinder joined to the inner bearing piston, said inner bearing cylinder extending into said interior space toward the second end of the housing, said inner bearing cylinder having an interior surface with longitudinally-oriented grooves therein and an outer surface with a plurality of spaced apart ball bearings arranged in a helical pattern extending partially outward from said outer surface;
a revolution drive divider section in said housing having two sides and a generally cylindrical passageway extending between the sides of said divider section, said passageway having an interior surface with helical grooves therein, wherein the inner bearing cylinder is positioned so that it extends part of the way into the generally cylindrical passageway of said revolution drive divider section wherein the ball bearings in the helical pattern engage with the helical grooves;
a linear drive assembly slidably mounted in said housing, said linear drive assembly comprising: a linear drive piston having two sides; a linear drive cylinder extending from a first side of said linear drive piston toward the first end of said housing, wherein said linear drive cylinder has an outer surface with a plurality of ball bearings arranged in spaced apart, longitudinally-oriented rows extending partially outwardly therefrom, wherein said linear drive cylinder is inserted into the generally cylindrical passageway of said revolution drive section and is slidably mounted inside of the inside surface of said inner bearing cylinder; and a shaft extending from proximal end adjacent a second side of said linear drive piston to a distal end that extends through the opening in the second end cap and beyond the second end of the housing,
wherein said revolution drive divider section divides the interior space into two chambers, wherein said housing has fluid passageways for each of said chambers to permit pressurized fluid to flow into and out of each of said chambers on either side of said inner bearing piston and said linear drive piston to facilitate movement of said pistons, which will in turn cause linear and/or rotational movement of said shaft.

14. A double-ended combination linear and rotary actuator comprising:
a housing having a longitudinal axis, a first end, and a second end, said housing defining a cylindrical interior space, said housing having an opening in its first end and an opening in its second end;
a revolution drive divider section in said housing having a first side, a second side, and a generally cylindrical passageway extending along the longitudinal axis of the housing between the sides of said divider section, said passageway having an interior surface with helical grooves therein;
a revolution piston positioned between the revolution drive divider section and the first end of the housing, said revolution piston configured to move longitudinally while rotating inside said housing, said revolution piston having a first surface and a second surface;
an inner bearing cylinder joined to the second surface of the revolution piston and extending toward the second end of the housing, said inner bearing cylinder having an interior surface with longitudinally-oriented grooves therein and an outer surface with a plurality of spaced-apart ball bearings distributed in a helical pattern thereon, wherein the inner bearing cylinder is positioned so that it extends part of the way into the generally cylindrical passageway of said revolution drive divider section wherein the ball bearings in the helical pattern engage with the helical grooves in said passageway of the revolution drive divider section;

a second cylinder joined to the first surface of the revolution piston, and extending toward the first end of the housing, said second cylinder having a generally cylindrical interior space having a surface with longitudinally-oriented grooves therein;

a first linear drive assembly slidably mounted in said housing, said first linear drive assembly comprising: a first linear drive piston having two sides; a first linear drive cylinder extending from a first side of said linear drive piston toward the first end of said housing, wherein said first linear drive cylinder has an outer surface with a plurality of ball bearings arranged in spaced apart, longitudinally-oriented rows extending partially outwardly therefrom, wherein said first linear drive cylinder is inserted into the generally cylindrical passageway of said revolution drive section and is slidably mounted inside of the inside surface of said inner bearing cylinder; and a first output shaft extending from proximal end adjacent a second side of said first linear drive piston to a distal end that extends through and beyond the opening in the second end of the housing;

a second linear drive assembly slidably mounted in said housing between the first end of the housing and the revolution drive divider section, said second linear drive assembly comprising: a second linear drive piston having two sides; a second linear drive cylinder extending from the second side of said second linear drive piston toward the second end of said housing, wherein said second linear drive cylinder has an outer surface with a plurality of ball bearings arranged in spaced apart, longitudinally-oriented rows extending partially outwardly therefrom, wherein said second linear drive cylinder is inserted into the interior space of said second cylinder to engage with the longitudinally-oriented grooves therein and is slidably mounted therein; and a second output shaft extending from proximal end adjacent the first side of said second linear drive piston to a distal end that extends through and beyond the opening in the first end of the housing, wherein said revolution piston and said linear drive pistons divide said interior space into a plurality of chambers, wherein said housing has a fluid passageway for each of said chambers to permit pressurized fluid to flow into and out of each of said chambers to facilitate movement of said pistons, which will in turn cause linear and/or rotational movement of said output shafts.

15. A double-ended combination linear and rotary actuator comprising:

a housing having a first end and a second end, and defining a cylindrical interior space, said housing having an opening in its first end and an opening in its second end;

an intermediate member positioned approximately midway between said first and second end of the housing that divides the interior space of the housing into a first portion and a second portion, wherein said intermediate member has a first surface and a second surface;

a first pair of pistons located inside the first portion of the cylindrical interior space between said intermediate member and the second end of the housing, said first pair of pistons comprising:

a first revolution piston configured to move longitudinally while rotating inside said housing, a first inner bearing cylinder in operative communication with said revolution piston and having an outer surface with a plurality of spaced-apart ball bearings distributed in a helical pattern thereon, wherein said ball bearings engage with a first structure in said housing having an inner surface with helical grooves therein; and a first linear drive piston having a first surface and a second surface that is slidably mounted in the housing, the first linear drive piston having a first input shaft joined to said first surface, said first input shaft having ball bearings arranged in a linear pattern on its surface, which first input shaft is inserted inside a first cylindrical component that has an inner surface with linear grooves;

a second pair of pistons located inside the second portion of the cylindrical interior space between said intermediate member and the first end of the housing, said second pair of pistons comprising:

a second revolution piston configured to move longitudinally while rotating inside said housing, a second inner bearing cylinder in operative communication with said revolution piston and having an outer surface with a plurality of spaced-apart ball bearings distributed in a helical pattern thereon, wherein said ball bearings engage with a second structure in said housing having an inner surface with helical grooves therein; and a second linear drive piston having a first surface and a second surface that is slidably mounted in the housing, the second linear drive piston having a second input shaft joined to said second surface, said second input shaft having ball bearings arranged in a linear pattern on its surface, which second input shaft is inserted inside a second cylindrical component that has an inner surface with linear grooves;

a first output shaft having a proximal end joined to the second surface of said first linear drive piston and a distal end extending through an opening in the second end of the housing; and a second output shaft having a proximal end joined to the first surface of said second linear drive piston and a distal end extending through an opening in the first end of the housing, wherein said pistons divide said interior space into a plurality of chambers, wherein said housing has a fluid passageway for each of said chambers to permit pressurized fluid to flow into and out of each of said chambers to facilitate movement of said pistons, which will in turn cause linear and/or rotational movement of said output shafts.

* * * * *